E. L. ROBERSON.
ANIMAL TRAP.
APPLICATION FILED DEC. 29, 1909.
992,065.
Patented May 9, 1911.
2 SHEETS—SHEET 1.
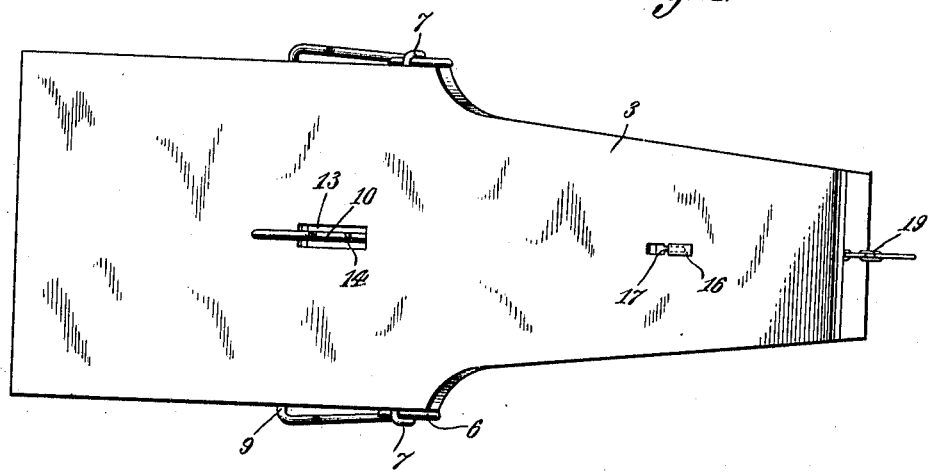
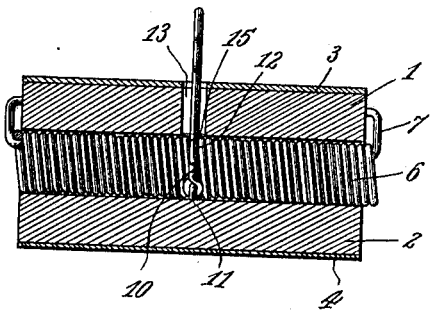
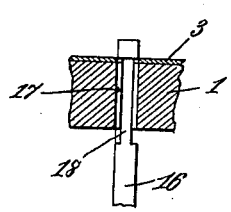
Witnesses
John H. Crawford
Inventor
Elige L. Roberson,
By Victor J. Evans
Attorney

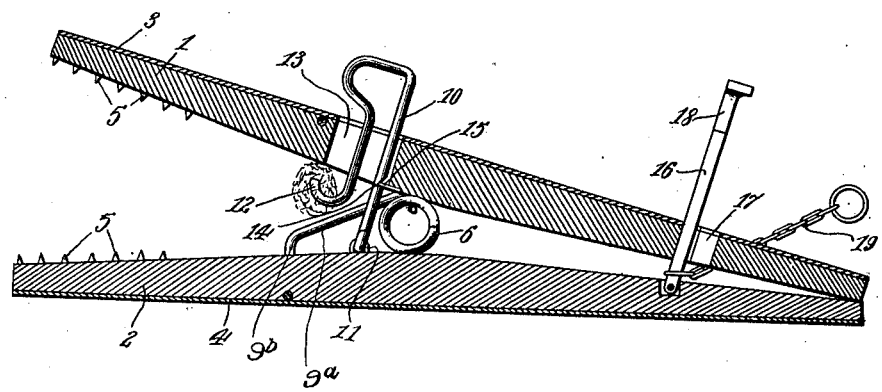
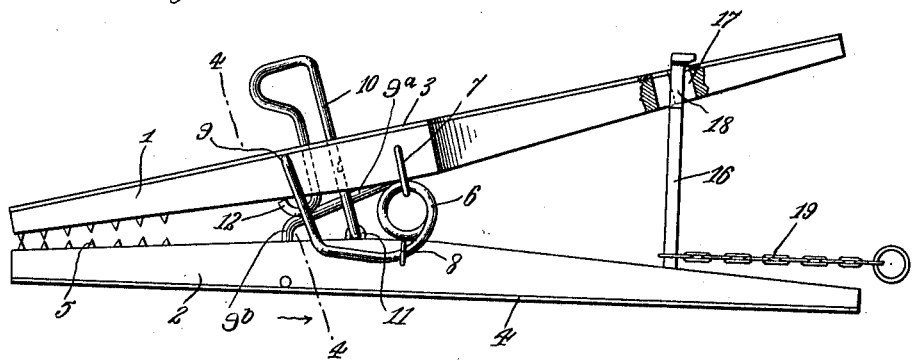
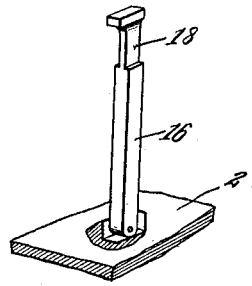

UNITED STATES PATENT OFFICE.

ELIGE L. ROBERSON, OF TYLER, TEXAS.

ANIMAL-TRAP.

992,065.  Specification of Letters Patent.  Patented May 9, 1911.

Application filed December 29, 1909.  Serial No. 535,383.

*To all whom it may concern:*

Be it known that I, ELIGE L. ROBERSON, a citizen of the United States, residing at Tyler, in the county of Smith and State of Texas, have invented new and useful Improvements in Animal-Traps, of which the following is a specification.

This invention relates to animal traps, and is intended for use in trapping fur-bearing animals, such as racoon, mink and the like which naturally touch all food with their foot or paw before eating the same, and the object of the invention is to provide a device of this character of an extremely simple and thoroughly effective construction which will securely retain the foot of the animal between the jaws of the trap, which when sprung is effectively locked by the forward movement of the animal in its effort to release its foot and which is so constructed as to prevent the animal from gnawing his foot so to sever the same from the trap and thus effect an escape.

With the above, and other objects in view which will appear as the description progresses, the invention resides in the novel construction and arrangement of parts hereinafter fully described and claimed.

In the accompanying drawings there has been illustrated and described the preferred embodiment of the improvement, and in which drawings, Figure 1 is a top plan view of a trap constructed in accordance with the present invention. Fig. 2 is a central longitudinal sectional view of the same. Fig. 3 is a side elevation of the same showing the jaws in their sprung or engaging position. Fig. 4 is a cross sectional view upon the line 4—4 of Fig. 3. Fig. 5 is a perspective view of the locking post or lever. Fig. 6 is a detail sectional view illustrating the lever in engaged position upon one of the members of the trap.

The ordinary construction of traps employed for trapping fur-bearing animals comprises, as is well known in the art, essentially a pair of spring pressed jaws which are constructed of iron and which are provided with what may be termed open faces, the engaging jaws being of a substantially U-shaped formation and having their meeting edges provided with teeth. With this construction of traps it is a comparatively easy task for an animal having its feet caught between the jaws to sever the foot and thus escape. It is the primary object of the present invention to provide a trap of a comparatively simple construction which will prevent this occurrence and which at the same time while effectively securing the animal, will not allow the tearing of the skin and the mutilation of the fur of the animal caught. To accomplish this I have provided a trap comprising essentially a pair of jaws designated by the numerals 1 and 2. The jaws proper are preferably constructed of wood and comprise substantially rectangular members, as clearly illustrated in Fig. 1 of the drawings. The top member 1 has its outer face provided with a covering of suitable metallic material designated by the numeral 3, while a similar facing is provided upon the lower jaw member 2 and is designated by the numeral 4. The forward or engaging portions of the inner faces of the members 1 and 2 are each provided with a plurality of teeth 5 and the said members 1 and 2 are hingedly connected together through the medium of a transversely extending spring member 6 which is connected with the member 1 through the medium of a suitable bail 7 having its ends bent to provide prongs adapted to be inserted within the sides of the said member 1. The end convolution of the spring 6 is connected with the side of the member 2 through the medium of a suitable securing element 8 and the extremity of this convolution is bent forwardly and upwardly and connected with the member 1 as indicated by the numeral 9. The opposite end convolution $9^a$ of the spring is inclined downwardly to a point adjacent the base 2 and terminates in an extending arm $9^b$ secured to the base in any suitable manner.

The numeral 10 designates the trigger of the device. This trigger 10 is also constructed of a single strand of suitable wire and is pivotally connected with the lower member 2 as at 11. The member 10 is provided with a forwardly and downwardly extending portion terminating in a bait hook 12 and the member 1 is provided with a suitable slot or opening 13 through which the trigger 10 projects. The trigger 10 is provided with a depressed or cut away portion 14 while the lower face of the member 1 is provided with a projection 15 which is adapted to engage the said offset when the members are in their open position, as illustrated in Fig. 2 of the drawings. By this arrangement it will be noted that when the animal attempts to obtain the bait upon the hook 12 the trigger 10 will be thrown out of contact with the projection 15 and the spring 6 will cause the jaws 1 and 2 to be brought violently together, while the teeth 5 will engage with the foot of the animal, thus securely obtaining the foot between the said jaws. It will be apparent that owing to the substantially rectangular formation of the jaws 1 and 2 the animal will not attempt to sever its paw, as it is well known to naturalists that animals only gnaw at portions of their body which have been caught or wounded and the wounded portion of the paw is concealed between the said jaws 1 and 2.

The rearwardly extending portion of the jaws 1 and 2 may be reduced as illustrated in Figs. 1 and 3 of the drawings, and pivotally connected with the jaw 2, a suitable distance to the rear of the spring 6 is a locking lever 16. This lever 16 projects through a cut away portion 17 provided by the upper jaw 2 and the said lever has its upper extremity reduced, as designated by the numeral 18 so as to provide spaced shoulders. The cut away portion 17 of the jaw 1 is substantially T-shaped, being provided with an enlarged opening communicating with a smaller centrally arranged opening and attached to the locking lever 16 is a suitable flexible element 19, such as a chain, which is adapted to be secured to the ground, or to a tree or to any other desired object adjacent which the trap is positioned. It is natural that when the animal has its paw engaged between the jaws 1 and 2 it will make an effort to withdraw the same, and in so doing will move the trap. The movement will cause the flexible element 19 to be drawn taut and the latter will swing the locking lever 16 upon its pivot and cause the depressed portion 18 of the said lever to engage between the walls of the reduced portion of the T-shaped opening, thus effectively and securely locking the engaged portion of the jaws.

From the above description, taken in connection with the accompanying drawings, it will be noted that I have provided an extremely simple and thorough device for the purpose intended, and while I have illustrated and described the preferred embodiment of the improvement, as it now appears to me, minor details of construction, within the scope of the following claim may be resorted to if desired.

Having thus fully described the invention, what I claim as new is:—

A trap comprising a pair of rectangular jaws having teeth on their forward inner faces, a metal coating for the outer faces of the jaws, a spring hinge connecting the jaws intermediate their length, a trigger pivoted to the lower jaw in front of the spring hinge and extending up through a slot in the upper jaw, said trigger comprising an upright arm having a small depression, therein, the latter extending forwardly and downwardly and terminating in a bait hook below the slot of the upper jaw, a projection at the lower edge of the slot adapted to engage the depression of the trigger arm to hold the jaws in open position, and means for locking the jaws in thrown position for the purpose set forth.

In testimony whereof I affix my signature in presence of two witnesses.

ELIGE L. ROBERSON.

Witnesses:
J. W. COOK,
J .W. BEAIRD.

---

Copies of this patent may be obtained for five cents each, by addressing the "Commissioner of Patents, Washington, D. C."